United States Patent [19]

Roggen

[11] 4,448,661
[45] May 15, 1984

[54] DEVICE FOR MEASURING THE BATH TEMPERATURE IN A FUSED SALT ELECTROLYTIC CELL USED FOR THE PRODUCTION OF ALUMINUM

[75] Inventor: Rolf Roggen, Sion, Switzerland

[73] Assignee: Swiss Aluminium Ltd., Chippis, Switzerland

[21] Appl. No.: 476,621

[22] Filed: Mar. 18, 1983

[30] Foreign Application Priority Data

Apr. 2, 1982 [CH] Switzerland ............... 2037/82

[51] Int. Cl.³ ............... C25C 3/12; G01J 5/28; G01J 5/08
[52] U.S. Cl. ............... 204/243 R; 204/67; 250/342; 356/44; 374/131; 374/139
[58] Field of Search ............... 204/67, 243 R, 286, 204/294, 279; 250/342, 357.1; 356/44, 51; 374/131, 139

[56] References Cited

U.S. PATENT DOCUMENTS

| 3,570,277 | 3/1971 | Dorr et al. | 374/131 |
| 3,745,834 | 7/1973 | Veltze et al. | 374/131 |
| 4,313,344 | 2/1982 | Brogardh et al. | 374/131 |

FOREIGN PATENT DOCUMENTS

| WO82/00712 | 3/1982 | PCT Int'l Appl. | 374/131 |
| 0183316 | 4/1963 | Sweden | 204/67 |

Primary Examiner—R. L. Andrews
Assistant Examiner—Terryence Chapman
Attorney, Agent, or Firm—Bachman and LaPointe

[57] ABSTRACT

The temperature measuring device comprises a rod which passes approximately vertically through the anode block and terminates at the level of the working face of the anode. Fitted over the rod at the top is a light plug which provides an optical connection to the fiber bundles with the minimum of reflection. This optical connection is usefully in a coupling fluid which, like the rod and the bundle of fibers, is able to transmit infra-red radiation.

12 Claims, 3 Drawing Figures

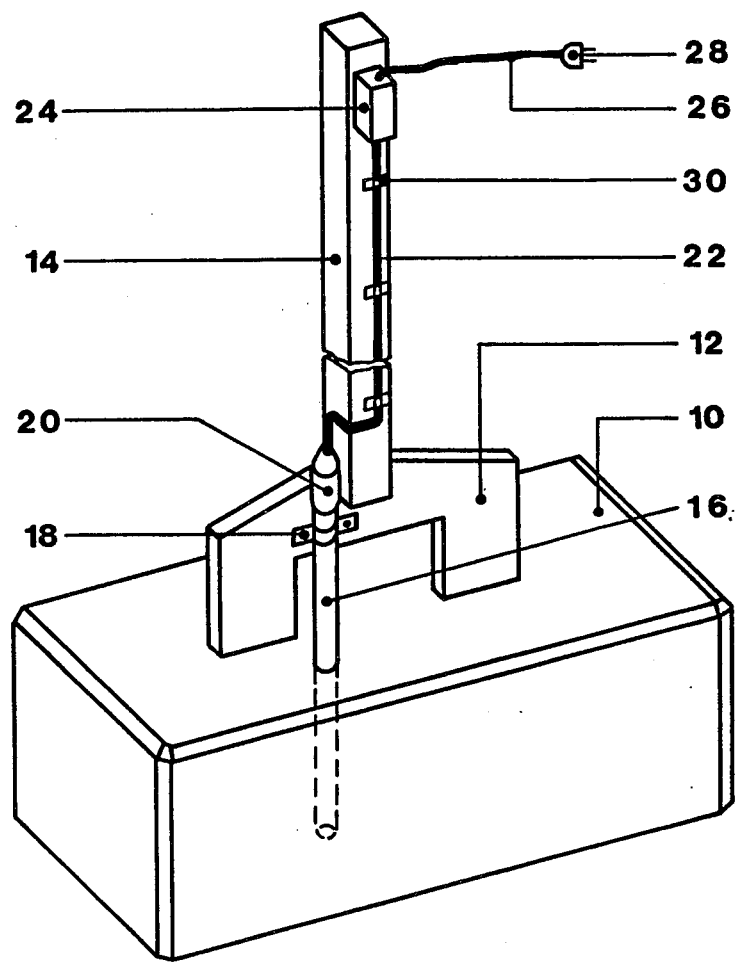

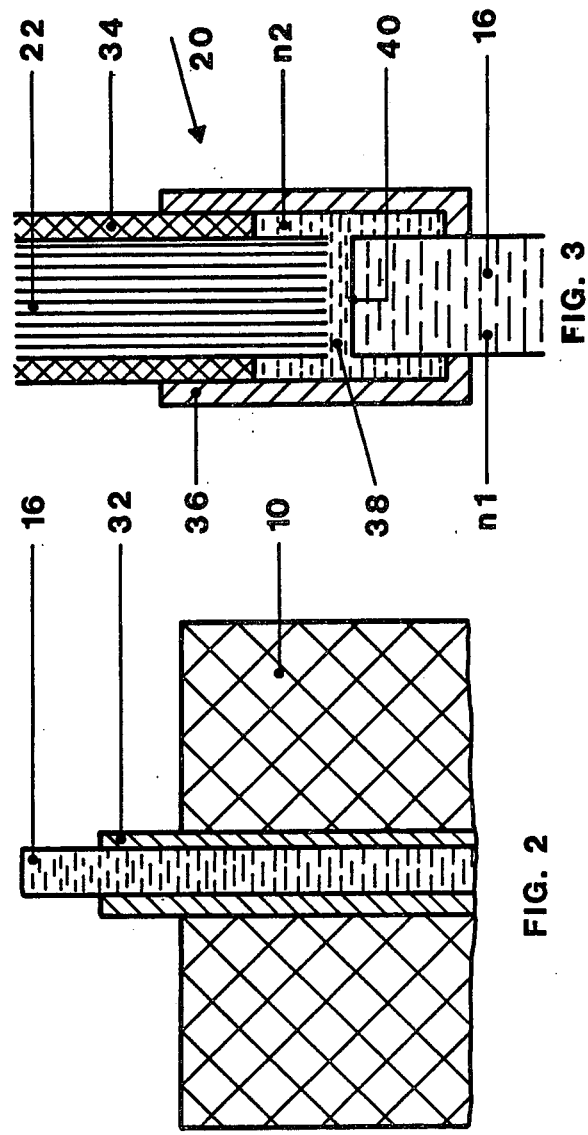

DEVICE FOR MEASURING THE BATH TEMPERATURE IN A FUSED SALT ELECTROLYTIC CELL USED FOR THE PRODUCTION OF ALUMINUM

BACKGROUND OF THE INVENTION

The present invention relates to a device for measuring the bath temperature in a fused salt electrolytic cell used to produce aluminum, in particular in such a cell employing carbon anodes.

Large scale production of aluminum today is still mainly by fused salt electrolytic reduction of aluminum oxide, for which purposes the aluminum oxide is dissolved in a fluoride melt comprised for the greater part of cryolite. The cathodically precipitated aluminum collects on the carbon floor of the cell under the fluoride melt, the surface of this liquid aluminum forming the actual cathode. Dipping into the melt from above are anodes which in the conventional process are made of amorphous carbon. As a result of the electrolytic decomposition of the aluminum oxide, oxygen is formed at the carbon anodes and reacts with the carbon there to form $CO_2$ and CO. The electrolytic process takes place in a temperature range of about 940°–970° C.

During the course of the electrolytic process, the electrolyte becomes depleted in aluminum oxide. At a lower concentration of 1 to 2 wt.% of aluminum oxide in the melt the anode effect takes place in that the voltage increases from from e.g. 4–5 V to 30 V and more. Then at the latest the aluminum oxide concentration of the bath must be increased by the addition of further alumina.

The present day, widely used electronic data processing methods used to regulate the cells require that the bath temperature be measured continuously. Any deviations from the desired temperature must be registered immediately. For this purpose direct methods of temperature measurement are employed e.g. by means of a thermocouple immersed in the bath, or via indirect methods such as an infra-red pyrometer.

Revealed in the German Pat. No. 28 44 417 are two thermocouple wires which are welded together and protected from attack by the molten electrolyte. These wires are embedded in an electrically insulating filler material enclosed in a protective tube, which is closed-off at one end, and is made up of multiple layers of metals and insulating materials. The protective tube is enclosed in a thick-walled graphite crucible. The upper part of this graphite crucible is protected by steel pipe which in turn is mainly covered over by a crust of solidified electrolyte.

Although this measuring facility has been able to fulfil the requirements of the aluminum producer in terms of mechanical properties and corrosion resistance in the chemically aggressive melt, it still exhibits certain disadvantages:

A considerable amount of heat is conducted via the protective pipe into the relatively cool region above the level of the bath, and some of this is lost via radiation and/or conduction. Consequently the temperature registered is too low.

The high heat capacity of the thick graphite wall leads to delays of about half an hour in indicating fluctuations in the bath temperature.

The thermocouple occupies considerable space and can therefore be positioned only beside the anode e.g. in the central gap at the longitudinal axis of the cell. This means that the temperature under the anode cannot be measured, which again leads to too low temperatures being recorded, and even these with a time delay.

Because of the crusting over of the thermocouples damage can occur to them when the anodes are changed.

The thermocouple according to the German Pat. No. 28 44 417 is relatively expensive.

The applicant, following a disclosed process, drilled an approximately vertical hole in a prebaked carbon anode, and mounted an infra-red pyrometer above this hole in line with its central axis above the reduction cell. In order to prevent the molten electrolyte from rising and solidifying in the hole, compressed air was introduced into the hole. The unfavorable location of the relatively expensive infra-red pyrometer in the anodic part of the cell, and the necessary injection of compressed air, together with the experience that in practice a crust-free and carbon-foam-free surface cannot be achieved, showed that this method of temperature measurement is not practical on an industrial scale.

SUMMARY OF THE INVENTION

It is therefore an object of the invention to develop a device, which is economic to produce and operate, for measuring the bath temperature in a fused salt electrolytic cell used for producing aluminum and in particular employing carbon anodes, and such that the said device facilitates continuous measurement of the bath temperature and immediately registers fluctuations in temperature.

The object is achieved by way of the invention as described hereinbelow:

Device for measuring the bath temperature in the pot of a reduction cell used for the fused salt electrolytic production of aluminum, in particular in such a cell using carbon anodes, characterized by way of, a rod (16) running approximately vertically through the anode block (10) and made of a material which transmits infra-red radiation and dissolves in the molten electrolyte at the same rate as the consumption of the anode but does not contaminate the aluminum produced, a light plug (20) fitted over the rod (16) viz., at least one bundle of fibers (22) which transmit infra-red radiation, are optically coupled to the rod (16), and, enclosed in a protective sheathing (34), lead to an infra-red detector (24) positioned in the upper region of the cell, and a transmitter or connecting cable (26) for communicating the electrical signal to the control system.

BRIEF DESCRIPTION OF THE DRAWINGS

The invention is explained in greater detail with the help of the exemplified embodiment shown in the drawings viz., FIG. 1: A perspective view of an anode with the device according to the invention.

FIG. 2: A vertical cross section through an anode block fitted with an optically transmittant rod surrounded by a protective sleeve.

FIG. 3: A vertical cross section through a light plug.

DETAILED DESCRIPTION

The device for measuring bath temperature is mounted on at least one anode per reduction cell. In a cell with, for example, 24 pre-baked anodes preferably 1–4 anodes are fitted with such devices.

The approximately vertical hole in the anode is made either in the green anode using an insert, or a suitable hole is drilled in the calcined anode.

The preferably round, optically transmittant rod is usefully 5-15 mm in diameter; its outer dimensions however correspond to the inside diameter of the hole in the anode. The optically transmittant rod is preferably in the form of a solid body; it can however still perform its task if in the form of a relatively thick-walled tube.

The optically transmittant rod is mounted in such a way that its base is flush with the bottom face of the anode. This way it lies at the same level as the working face of the anode in contact with the molten electrolyte.

The material of the light transmittant rod is chosen such that it not only transmits infra-red radiation, but also that it dissolves in the molten electrolyte at approximately the same rate as the anode is consumed. It is also important for the aluminum produced that the rod contains no components which would excessively contaminate the aluminum produced. The rod is therefore made of $SiO_2$, preferably corundum which transmits infra-red radiation.

In the light plug the transmission of the signal from the rod into the coupling fluid or directly into the glass fibers must be made with as little reflection as possible. Following the relationship:

$$R = \left(\frac{n_1 - n_2}{n_1 + n_2}\right)^2$$

for the reflection R, the index of refraction $n_2$ of the coupling fluid must be as high as possible or, more precisely, should be as close as possible to the index of refraction $n_1$ of the optically transmittant rod or fiber material. In this case R would be approximately zero.

The bundles of fibers, protected by a sleeve, are secured to the anode pin or preferably in a specially provided channel.

The infra-red detector mounted in the upper region of the anode rod converts the optical signal into an electrical signal which is transmitted further to the computer controlled process control system. Radio wave transmission is more expensive but offers the advantage over cable connection that anode changing is hindered less.

According to a preferred version the hole in the anode block is made slightly larger than the diameter of the rod and is lined with a protective sleeve. This prevents the optically transmittant rod from coming directly into contact with the carbon of the anode and from being attacked at the high temperature of cell e.g. by carbon reacting with $SiO_2$. Sintered aluminum oxide is particularly suitable material for the protective sleeve, which projects out of the anode. This dissolves in the molten electrolyte at about the same rate as the anode burns away; furthermore the aluminum produced is in no way contaminated.

The wall thickness of the protective sleeve is not of great importance; it lies however between 1 and 5 mm.

In practice the lower end of the optically transmittant rod dips into the molten electrolyte together with the bottom face of the anode. This lower end is dissolved away at the same rate as the anode bottom face i.e. approximately 15 mm/day. The characteristic radiation of the rod or the molten electrolyte in contact with it is transmitted, without any significant losses, via the light plug to the infra-red detector. As a result the bath temperature can be measured without any further, auxiliary facilities, and this always at the same place viz., where the heat of the reaction is created.

The advantages of the invention can be summarized as follows:

The temperature is measured under the anode at the place where the electrical and chemical heat are created. All changes in process parameters which have an influence on changes concerning the bath temperature (e.g. electric current, changes in the bath, anode beam position etc.) are registered immediately.

A new optically transmittant rod is provided with each anode change. This can take place away from the reduction cell without requiring any special measures or precautions.

The device is insensitive to mechanical effects during the operation of the cell e.g. crust breaking or anode changing.

In the case of cells with individual suspension of the anodes each anode can be provided and individually served by a device according to the invention.

The cost of consumable optically transmittant rods is small viz. less than about twenty-five U.S. Dollars per sensor per month.

Referring to the drawings, FIG. 1 shows an anode for use in the fused salt electrolytic production of aluminum comprising a pre-baked anode block 10 which is suspended from an anode rod 14 via pins 12. A rod 16 made of a material which can transmit infra-red radiation penetrates the anode block 10 in the vertical direction and is flush with the bottom face of the anode block 10. The rod 16 is held on the pin 12 by means of a clamp 18, close to the anode rod 14. A light plug 20 is fitted over the rod 16. At least one bundle of fibers 22 leads from the light plug 20 to the infra-red detector 24. In this infra-red detector 24 the optical signals are converted into electrical signals and transmitted via a connecting cable 26 and a plug 28 to the control system for the electrolytic process. Before the anode is changed this plug 28 must be pulled out; usefully therefore the electric circuit is arranged such that the electrical contact at the plug is automatically interrupted on changing anodes.

The sheathed bundle or bundles of fibers 22 can, instead of being held in place by a clamp 30, be situated in a recess (not shown here) in the anode rod 14.

In the version according to FIG. 2 the rod 16 of optically transmittant material passing through the anode block 10 is enclosed in a protective pipe 32. This pipe 32 is made of sintered aluminum oxide. It projects some centimeters beyond the top surface of the anode block.

The light plug 20 in FIG. 3 provides the optical connection between the rod 16 and the bundle of fibers 22 enclosed in a sheathing 34. A housing 36 is filled with a coupling fluid 38 the index of refraction $n_2$ of which is as close as possible to the index of refraction $n_1$ of the rod 16 thus preventing any significant reflection at the top surface 40 of the rod 16.

What is claimed is:

1. Device for measuring the bath temperature in the pot of a reduction cell used for the fused salt electrolytic production of aluminum which comprises: at least one anode in combination with said cell; a rod running approximately vertically through said anode and made of a material which transmits infra-red radiation and dissolves in the molten electrolyte at approximately the same rate as the consumption of the anode, wherein said rod is made of a material which contains no components which would excessively contaminate the aluminum produced; an infra-red detector optically coupled to the rod; at least one bundle of fibers which transmit infra-red radiation communicating between the infra-red detector and the rod; means for optically connecting said rod and fibers including a light plug between the fibers and the rod for transmitting the signal from the rod to the fibers, wherein the light plug contains a coupling fluid which transmits infra-red radiation and has an index of refraction ($n_2$) approximately the same as that ($n_1$) of the rod; and a transmitter or connecting cable for communicating an electrical signal from the infra-red detector to the control system.

2. A device according to claim 1 wherein said anode is a carbon anode.

3. A device according to claim 1 wherein said fibers are enclosed in a protective sheathing.

4. A device according to claim 1 wherein the infra-red detector is positioned in the upper region of the cell.

5. A device according to claim 1 wherein the rod is made of $SiO_2$ or of corundum capable of transmitting infra-red radiation.

6. A device according to claim 1 wherein the rod is round in cross section.

7. A device according to claim 6 wherein the diameter of the rod is 5–15 mm.

8. A device according to claim 1 wherein the rod is, at least in the region of the anode, embedded in a protective pipe which dissolves in the molten electrolyte and does not contaminate the electrolyte.

9. A device according to claim 8 wherein the protective pipe projects out some centimeters above the top surface of the anode.

10. A device according to claim 8 wherein the protective pipe is made of sintered aluminum oxide.

11. A device according to claim 1 wherein said anode is a pre-baked anode and including an anode pin and rod supporting said anode, wherein the rod, the light plug, the fiber bundle and the infra-red detector are secured to at least one of the anode pin, and the anode rod.

12. A device according to claim 1 wherein the lower end of the rod together with the bottom face of the anode dips into the molten electrolyte and is dissolved thereby at substantially the same rate.

* * * * *